United States Patent [19]

Houle

[11] 4,250,622
[45] Feb. 17, 1981

[54] SAFETY BLADE FOR A ROTARY TRIMMER

[76] Inventor: Elmer R. Houle, 6040 N. 7th St., Suite 101, Phoenix, Ariz. 85014

[21] Appl. No.: 66,092

[22] Filed: Aug. 13, 1979

Related U.S. Application Data

[63] Continuation-in-part of Ser. No. 937,435, Aug. 28, 1978, abandoned, which is a continuation-in-part of Ser. No. 919,164, Jun. 26, 1978, abandoned, which is a continuation-in-part of Ser. No. 833,229, Sep. 14, 1977, abandoned.

[51] Int. Cl.³ .............................................. A01D 55/00
[52] U.S. Cl. ........................................ 30/347; 56/295
[58] Field of Search .................... 30/276, 347, 206; 56/295, 12.7

[56] References Cited

U.S. PATENT DOCUMENTS

| | | | |
|---|---|---|---|
| 200,114 | 2/1878 | Whitney | 56/295 |
| 255,913 | 4/1882 | Beckwith | 56/295 |
| 1,550,342 | 8/1925 | Cogley | 30/276 |
| 2,028,784 | 1/1936 | Jennett | 30/276 |
| 2,427,265 | 9/1947 | Dreischerif | 30/206 |
| 3,176,455 | 4/1965 | Buchanan | 56/295 |
| 3,911,652 | 10/1975 | Houle | 56/295 |
| 3,975,891 | 8/1976 | Gunther | 56/295 |

*Primary Examiner*—Jimmy C. Peters
*Attorney, Agent, or Firm*—Don J. Flickinger

[57] ABSTRACT

A safety cutter blade for a rotary trimmer. The blade has a circular hub formed with a central opening for mounting the blade on the drive shaft of a rotary trimmer. An annulus is made integral with and coplanar with the hub. A plurality of cutting teeth are formed integrally with the annulus at its periphery. Each tooth is provided with a swept convex cutting edge and a straight cutting edge on opposite sides thereof. The convex cutting edges constitute a set of negative cutting edges which force severed foliage away from the center of the blade while the straight cutting edges constitute a second set of cutting edges which are adapted to cutting short grass. Each of these sets of cutting edges is adapted to be effective when they are the leading edges of the teeth of the cutter blade which is determined by the direction of rotation of the trimmer drive shaft and the position of the blade relative thereto. The blade is molded from an elastomeric material reinforced with fibers made of an organic polymer and has embedded in the elastomeric material a layer of coarse fabric made from an organic polymer. The size of the fabric is coextensive with that of the blade and the fabric is positioned to intersect the cutting edges of the teeth of the blade.

13 Claims, 3 Drawing Figures

SAFETY BLADE FOR A ROTARY TRIMMER

CROSS-REFERENCE TO RELATED APPLICATIONS

This application is a continuation-in-part of copending application of Elmer R. Houle, Ser. No. 937,435 now abandoned, filed Aug. 28, 1978 which in turn is a continuation-in-part of application Ser. No. 919,164 now abandoned, filed June 26, 1978 which in turn was a continuation-in-part of application Ser. No. 833,229 now abandoned, filed Sept. 14, 1977.

BACKGROUND OF THE INVENTION (1) Field of the Invention

This invention relates to cutter blades for rotary trimmers and more particularly to safety cutter blades made of materials which significantly reduce the risk of injury to operators of such devices and persons in the vicinity thereof.

(2) BACKGROUND OF THE INVENTION

Rotary trimmers of the type with which the instant invention is adapted to be used may be classified in three categories. One is for cutting brush, or brush cutters; a second is for long grass or weeds; and the third is for short grass found in a lawn in positions which a conventional lawn mower cannot reach.

The cutter blades of such trimmers are made of metal and thus present a hazard to operators of such devices as well as people in the vicinity. The recognition of the risk associated with rotary powered mowers and cutting devices has led to the development of safety cutter blades primarily for power lawn mowers. A problem with existing blade designs for rotary trimmers is that when used to cut high grass and weeds, some such designs cause the long grass and weeds to become wound around the shaft rotating the blades which creates a sufficient drag to stall the motor of such trimmers. Blades which tend to prevent long grass and weeds from winding around the shaft are not as effective in cutting short grass when the trimmer is used to trim in places around the lawn which the conventional power mower cannot reach.

To be economically successful, safety trimmer blades must have substantially the same or better performance and useful life as metal blades, be comparable in cost while retaining their safety features. Another characteristic that safety trimmer blades need to successfully compete with conventional blades is a high moment of inertia, to overcome momentarily high resistance to cutting from dense bodies or bunches of weeds or grass. Prior art safety trimmer blades have not been successful in satisfying these criteria.

SUMMARY OF THE INVENTION

The present invention provides a safety blade for a rotary trimmer made of a flexible elastomeric material such as rubber, which may include fibers of an organic polymer, and which is provided with a layer of coarse fabric made of an organic polymer such as nylon. The blade has a central cylindrical hub and an annulus which is integral with and extends radially outwardly from the hub. A plurality of equiangularly spaced cutting teeth are made integral with the annulus and extend outwardly from the outer periphery of the annulus. Each cutting tooth has two sides, one side having a curved swept cutting edge and the other a substantially straight cutting edge. The cutting edges define cutting edge planes. The fabric is embedded in the elastomeric material and is substantially coextensive with each blade. The fabric intersects, or forms, the cutting edges of each cutting blade. The swept curved cutting edges are intended to operate on long grasses or weeds to produce a negative cutting action by applying a force to the severed portions which throws foliage outwardly and away from the drive shaft of the trimmer, and thus minimizes the risk that the cut foliage will become wrapped around the shaft of the trimmer and cause its motor to stall. The straight cutting edges which can be swept forward to produce a positive cutting action on short grass lawns, for example, apply a force to the severed portions directed inwardly. Such a blade cuts short grasses better and more evently. The short lengths of grass will not collect on the drive shaft of the trimmer and create a sufficient load or drag to stall the engine.

Based on the foregoing, the present invention has the following objects:

1. To provide a safety cutter blade for rotary trimmers which is of an elastomer material or a reinforced elastomeric material and which has appreciable mass to overcome significant increases in the resistance of foliage to cutting over a short interval of time.

2. To provide a safety cutter blade which consists essentially of a hub and an annulus extending radially outwardly from the hub and having cutting teeth formed on the periphery of the annulus.

3. To provide in a safety cutter blade a hub which is comparatively thick and is formed with a central opening for mounting it on the drive shaft of a rotary trimmer, and an annulus that is relatively thin as compared to the hub, which annulus is integral therewith and extends radially outwardly therefrom to increase the moment of inertia of the blade.

4. To provide in a safety cutter blade having a plurality of cutting teeth equiangularly spaced around the periphery of the annulus, each of which teeth has two sets of cutting edges, one set being of swept convexly curved cutting edges, and the other set of swept forwardly substantially straight cutting edges with a layer of coarse fabric embedded in each cutting tooth and intersecting and forming the cutting edges of each tooth.

5. To provide a safety blade having a hub, an annulus and a plurality of cutting teeth which are made of a flexible elastomeric material containing fibers of an organic polymer with a coarse fabric, made of an organic polymer embedded therein and substantially coextensive with the area of the blade and forming the cutting edges of the cutting teeth of the blade.

BRIEF DESCRIPTION OF THE DRAWINGS

Other objects, features and advantages of the invention will be readily apparent from the following description of certain preferred embodiments thereof, taken in conjunction with the accompanying drawings, although variations and modications may be effective without departing from the spirit and scope of the novel concepts of the disclosure, and in which.

DESCRIPTION OF THE PREFERRED EMBODIMENT

Figure 1:
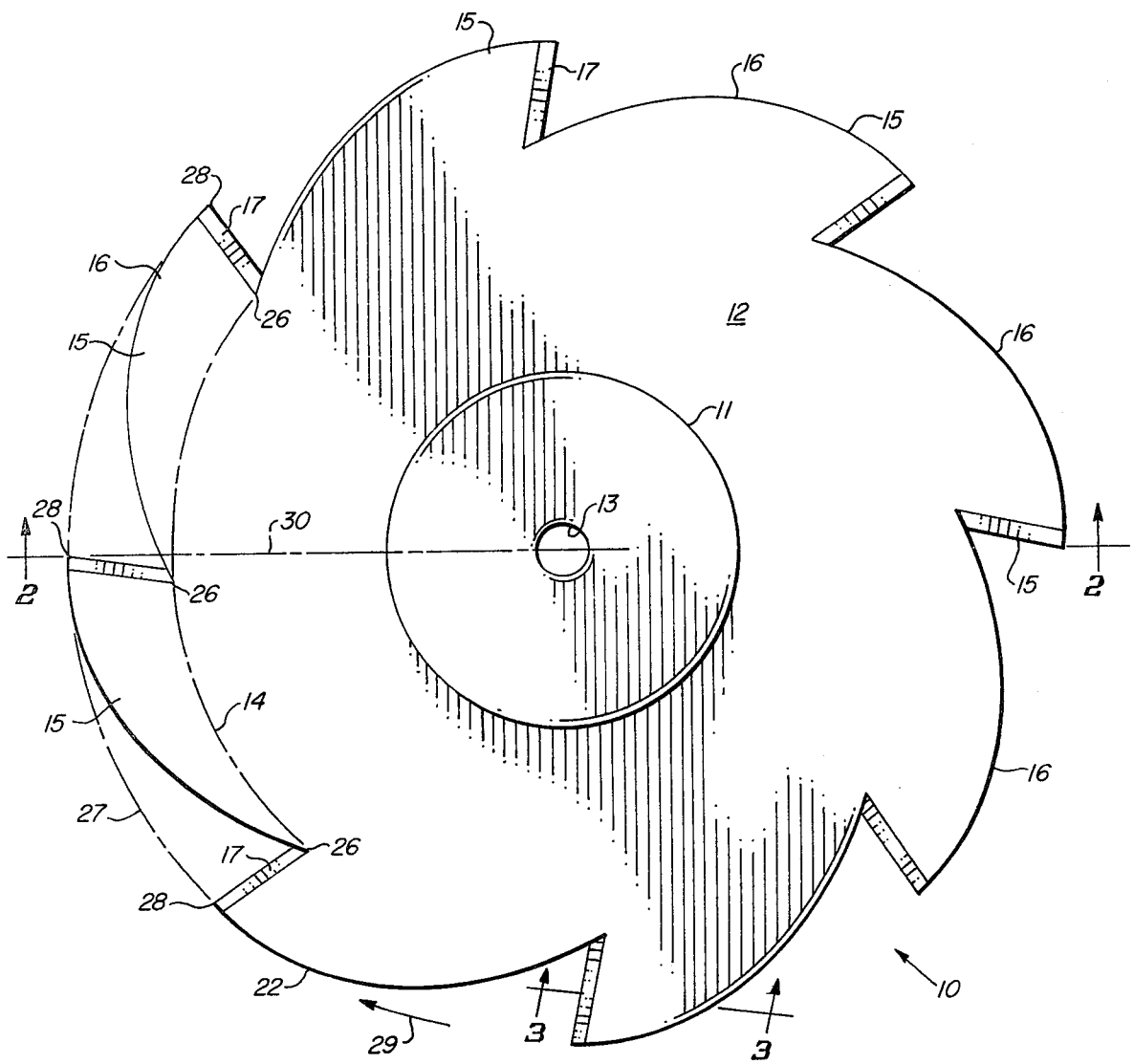
FIG. 1 is a plan view of a safety cutter blade for rotary trimmers designed in accordance with the precepts of this invention.
Figure 2:
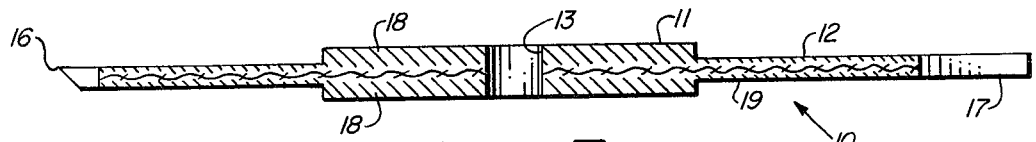
FIG. 2 is a section through the blade illustrated in FIG. 1, being taken along the line 2—2 of FIG. 1.

Referring now to the drawing, wherein like reference characters denote corresponding elements throughout the several views, the first, more particularly to FIG. 1, a safety cutter blade for a rotatry trimmer embodying the principles of this invention is referred to in its entirety by the reference character 10. Blade 10 includes a circular hub 11 which, in the preferred embodiment, is substantially thicker than annulus 12, which is integral therewith and extends radially outwardly therefrom. Hub 11 is formed with a central aperture 13, which is used to detachably mount blade 10 on the drive shaft of a rotary trimmer. Inasmuch as rotary trimmers of the type with which this invention is concerned are well known, and particularly the drive shaft thereof, it is deemed unnecessary to illustrate and describe a rotary trimmer in this application. Annulus 12 has an outer periphery 14 with a plurality of cutting teeth 15 formed integrally with annulus 12 and extending outwardly from periphery 14. Each tooth 15 has a swept convex cutting edge 16 constituting a negative cutting edge and a plurality of substantially straight swept forward cutting edges 17 constituting positive cutting edges. Hub 11, annulus 12 and teeth 15 are made of a flexible elastomeric material such as rubber which, in the preferred embodiment, is reinforced by fibers of an organic polymer such as nylon. In addition a layer of coarse fabric 19 is embedded in material 18 as illustrated in FIGS. 2 and 3.

Figure 3:
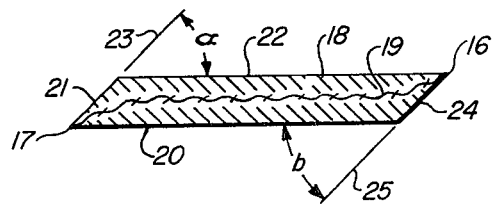
FIG. 3 is an enlarged section taken along the line 3—3 of FIG. 1.

FIG. 3 illustrates a portion of a tooth 15 on which cutting edges 16 and 17 are formed. Cutting edge 17 is defined by plane surface 20 and bevelled surface 21. Tooth 15 also includes a second plane surface 22 which is substantially parallel to the surface 20, and this surface, together with line 23, which is an extension of bevelled surface 21, defines an angle alpha, which is in the preferred embodiment substantially 45°. Cutting edge 16 is defined by plane surface 24 which is comparable to bevelled surface 21 with which it is substantially parallel. An extension of surface 24, line 25, cooperates with plane surface 20 to define an angle beta which is, in the preferred embodiment, also substantially 45°.

It is noted that annulus 12, in a preferred embodiment, is formed with eight teeth 15. This number, of course, is subject to variation depending upon the size of the trimmer with which blade 10 are designed to be used.

The outer periphery 14 of annulus 12 is defined as being the circle through the apices 26 at the intersection of edges 16 and 17, which in the preferred embodiment will have a radius of four inches. If a circle 27 is drawn through the adjacent apices 28 the outer intersection of cutting edges 16 and 17, of each tooth 15, circle 27 will in the preferred embodiment have a radius of five and one-half inches.

In the preferred embodiment, elastomeric material 18 is a rubber to which has been added fibers of an organic polymer such as nylon with the fibers constituting from 45 to 60% of the weight of the rubber fiber mixture. To minimize cost, the rubber can be reclaimed rubber from scrap tires for example. Such reclaimed rubber will contain up to 40% by weight of nylon fibers when the tires from which the rubber is reclaimed have nylon cord. The maximum length of the fibers is substantially one-half an inch. Such fibers reclaimed from such tires can be added back into the mixture to bring the proportions of rubber to nylon fiber into the desired range.

Fabric 19 is woven from cords or large threads of an organic polymer such as nylon in the preferred embodiment which has the desired properties of resiliency, tensile strenth and resistance to wear needed to produce a safety cutter blade for a rotary trimmer. In the preferred embodiment, the threads are 0.035 inches in diameter and the warp has from 20-25 such threads per inch and the woof has from 10-15 threads per inch. A commercially available fabric which meets these specifications is made by the B.F. Goodrich Industrial Products Company and is identified as G.R. 953 Nylon Fabric.

In fabricating blade 10, a layer of elastomeric material is placed in an appropriately designed mold, a layer of fabric 19 is placed in the mold overlying the first layer of elastomeric material and the balance of the mold is then filled with material 18 overlying the fabric layer 19. Fabric 19 is generally positioned in the center or the middle of the material 18 so that the thickness of material 18 on either side of fabric 19 is generally equal except at the cutting edges of the cutting teeth 15 as illustrated in FIGS. 2 and 3. Fabric 19 is preferably cut from a single piece of material and has a shape and size substantially equal to the size and shape of blade 10 in plan view. Fabric 19 is positioned so that it intersects or forms the cutting edges 16, 17 of the cutting teeth 15 as seen in FIG. 3.

Heat and pressure are applied to the contents of the mold to vulcanize them to form blade 10.

While the manner in which safety blade 10 operates is believed to be obvious from the illustrations and descriptions set forth above, in operation blade 10 is mounted on the drive shaft of a conventional trimmer which generally rotates in only one direction. The direction of rotation is generally clockwise as indicated by arrow 29. If blade 10 is positioned on the drive shaft so that the straight cutting edge 17 is the leading cutting edge of the teeth 15 as illustrated in FIG. 1, the surface 22 of the teeth 15 will be the top surface and surface 20 will be the bottom. Cutting edges 17 are swept forward when they are the leading edge since a radius 30 through apices or intersection 28 of a tooth 15 will proceed or lead the cutting edge 17 when it is the leading edge. Convex curved swept cutting edges 16 which are swept rearwardly when the cutting edge 16 is the leading edge since the radius 30 through apice 28 of each tooth 15 will always trail cutting edge 16 when it is the leading edge. When cutting edge 17 is the leading edge, grass severed by the cutting teeth 15 will have a component force directed inwardly toward the center of blade 10. Since cutting edges 17 are optimized for cutting short grass, the short grass will not become wound around the shaft on which blade 10 is mounted.

If long grass or high weeds are to be cut, blade 10 is removed, inverted, and remounted on the drive shaft of the trimmer with the convex swept cutting edges 16 as the leading cutting edges of teeth 15. Severed portions of grass and weeds cut by the swept cutting edges 16 will have imported to them a component of velocity away from the center of blade 10 which minimizes the risk of such severed materials becoming wrapped around the drive shaft and stalling the motor of the trimmer.

The presence of fabric 19 resists elongation of the teeth 15 in operation due to centrifugal force and the overall design of the short teeth with the annulus 12 increases the resistance of the blade to deflection due to forces applied to the cutting teeth 15 in cutting plants such as grass, weeds, etc. The presence of fabric 19 at the cutting edges 16, 17 makes the cutting more effective, comparable to that achieved by metal blades, and resists rapid abrasion or erosion of the cutting edges 16, 17. Because the heavy nylon thread in a fabric 19 has greater resistance to abrasion, the cutting edges are ablated more slowly than the elastomeric 18 with a result that the cutting edges are self-sharpening. The presence of reinforcing fibers in the elastomeric material 18 also tends to increase the resistance of blade 10 to elongation, deflection and rapid wear which supplements the effect of fabric 19 so that a single layer of fabric 19 is all that is needed to produce a blade having comparable qualities to one having multiple layers of fabric.

The increased moment of inertia of blade 10 to primarily annulus 12 gives the blade the capability of overcoming, momentarily significant increases in resistance encountered when cutting non-homogeneous foliage without stalling the motor of the trimmer on which the blades of this invention are adapted to be mounted.

The cutting edges 16 and 17 define cutting edge planes. In the embodiment illustrated in FIG. 3, the two cutting edge planes are defined by cutting edges 16 and 17 which are parallel to each other and spaced apart a distance substantially equal to the thickness of tooth 15. When blade 10 is mounted on the drive shaft of a trimmer, the cutting edge planes defined by the cutting edges 16 and 17 substantially lie in planes of rotation of the axis of rotation of the drive shaft.

It should be evident that various modifications can be made to the described embodiments without departing from the scope of the present invention.

What is claimed is:

1. A safety blade for a rotary trimmer having a drive shaft adapted to be rotated about an axis of rotation in one direction, said blade comprising:
    a central hub;
    means on said hub for mounting the blade on a drive shaft for rotation with the drive shaft;
    an annulus outstanding from the hub made integral and coplaner with the hub, said annulus having a periphery;
    a plurality of cutting teeth integral with the annulus and extending outwardly from the periphery, said teeth being equiangularly spaced, each tooth having two sides, one side having a curved swept backward cutting edge formed thereon, and the other a substantially straight cutting edge, said cutting edges substantially defining cutting edge planes; and
    said hub, annulus and teeth being formed of an elastomeric material with a layer of coarse fabric made of an organic polymer embedded in said elastomeric material, said fabric being substantially coextensive with each blade, and being positioned to intersect cutting edges of each tooth; whereby when the blade is mounted on a drive shaft of a trimmer in one position, the curved swept cutting edges of the teeth are the leading edges and apply an outwardly directed force against plants being cut so that the severed portions of such plants are forced away from the drive shaft, and when the blade is mounted in its other position, the straight cutting edges of each tooth are the leading edges which edges are adapted to cut short grass.

2. The safety blade of claim 1 in which there are eight teeth.

3. The safety blade of claim 1 in which each swept cutting edge is a convex curve.

4. The safety blade of claim 3 in which each of the straight cutting edges is swept forward.

5. The safety blade of claim 4 in which the swept convex cutting edges define one cutting edge plane and the swept forward cutting edges define a second cutting edge plane, both of which lie in planes of rotation about a drive shaft on which the blade is adapted to be mounted.

6. The safety blade of claim 1 in which the elastomeric material includes fibers of an organic polymer which is substantially uniformly distributed throughout the elastomeric material and which fibers are randomly oriented.

7. The safety blade of claim 6 in which the elastomeric material is a rubber.

8. The safety blade of claim 7 in which the organic polymer of the fibers is a nylon.

9. The safety blade of claim 8 in which the fibers constitute from 45 to 60% of the weight of the material and the maximum length of the fibers is substantially one-half inch.

10. The safety blade of claim 9 in which the coarse fabric is a single contiguous piece of fabric having a shape and size substantially corresponding to the dimensions of the blade in a plane defined by the cutting edges of the teeth.

11. The safety blade of claim 10 in which the organic polymer of the fabric is a nylon.

12. The safety blade of claim 11 in which the threads of the fabric are substantially 0.035 inches in diameter.

13. The safety blade of claim 12 in which the number of warps per inch is in the range of from 20–25 and the number woofs per inch is in the range of from 10–15.

* * * * *